United States Patent
Miyazawa et al.

(10) Patent No.: US 9,608,302 B2
(45) Date of Patent: Mar. 28, 2017

(54) AIR BATTERY

(71) Applicant: NISSAN MOTOR CO., LTD., Kanagawa (JP)

(72) Inventors: Atsushi Miyazawa, Kamakura (JP); Mori Nagayama, Yokohama (JP); Yoshiko Tsukada, Yokohama (JP); Nobutaka Chiba, Yokohama (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 380 days.

(21) Appl. No.: 14/358,165

(22) PCT Filed: Oct. 30, 2012

(86) PCT No.: PCT/JP2012/077956
§ 371 (c)(1),
(2) Date: May 14, 2014

(87) PCT Pub. No.: WO2013/084625
PCT Pub. Date: Jun. 13, 2013

(65) Prior Publication Data
US 2014/0315106 A1    Oct. 23, 2014

(30) Foreign Application Priority Data

Dec. 5, 2011 (JP) ................................ 2011-265876
Dec. 5, 2011 (JP) ................................ 2011-265973

(51) Int. Cl.
*H01M 12/08* (2006.01)
*H01M 12/06* (2006.01)
*H01M 2/20* (2006.01)

(52) U.S. Cl.
CPC ........... *H01M 12/08* (2013.01); *H01M 2/206* (2013.01); *H01M 12/065* (2013.01); *H01M 2220/20* (2013.01); *Y02E 60/128* (2013.01)

(58) Field of Classification Search
CPC .......................................... H01M 12/04–12/08
See application file for complete search history.

(56) References Cited

U.S. PATENT DOCUMENTS 3,462,307 A    8/1969  Voorhies et al.
2011/0059364 A1    3/2011  Zhang et al.
(Continued)

FOREIGN PATENT DOCUMENTS

JP    57023479 A    2/1982
JP    3735518 B2    1/2006
(Continued)

*Primary Examiner* — Maria J Laios
*Assistant Examiner* — Robert S Carrico
(74) *Attorney, Agent, or Firm* — Young Basile Hanlon & MacFarlane, P.C.

(57) ABSTRACT

An air battery includes a cathode layer and an anode layer sandwiching an electrolyte layer, and an electrically insulative outer case. The cathode layer has a cathode member, a cathode current collector and a liquid tight/gas permeable member. The cathode layer is provided with a contact member between the outer case and the cathode layer, in which the inner end thereof is in contact with the periphery of the cathode current collector, and the outer end thereof is exposed on a cathode-side surface. The outer end of the contact member protrudes outward with respect to a surface of the liquid tight/gas permeable member to an extent reaching at least a plane including an end face of the outer case. Therefore, this air battery can be directly connected to another battery in series, and is suitable for an on-vehicle power source.

12 Claims, 14 Drawing Sheets

(56) References Cited

U.S. PATENT DOCUMENTS

| | | | |
|---|---|---|---|
| 2011/0200891 A1 | 8/2011 | Kotani et al. | |
| 2012/0028136 A1* | 2/2012 | Sato | H01M 2/1653 |
| | | | 429/403 |
| 2012/0208096 A1* | 8/2012 | Kuboki | H01M 12/08 |
| | | | 429/405 |
| 2012/0321968 A1* | 12/2012 | Sato | H01M 12/06 |
| | | | 429/403 |

FOREIGN PATENT DOCUMENTS

| | | | |
|---|---|---|---|
| JP | 2010238663 A | 10/2010 | |
| WO | 2010050028 A1 | 5/2010 | |
| WO | 2011087089 A1 | 7/2011 | |

\* cited by examiner

AIR BATTERY

CROSS REFERENCE TO RELATED APPLICATIONS

The present application claims priority to Japanese Patent Application Nos. 2011-265876, filed Dec. 5, 2011 and 2011-265973, filed Dec. 5, 2011; each incorporated herein in its entirety.

TECHNICAL FIELD

The present invention relates to an air battery that uses oxygen for a cathode active material, in particular to an air battery suitable for making an assembled battery by connecting a plurality of the batteries.

BACKGROUND

Conventional air batteries are described, for example, in Japanese Patent No. 3735518. The air battery described in Japanese Patent No. 3735518 includes an electrode assembly in which a non-aqueous electrolyte layer is sandwiched between a cathode and an anode, and also includes a housing case in which the electrode assembly is housed together with terminals of the cathode and anode. The two terminals protrude from the housing case in opposite directions. Further, the air battery has a plurality of air holes on the wall of the housing case at the cathode side. These air holes are sealed with a sealing tape, and are opened before use by peeling the sealing tape so as to allow air (oxygen) to be supplied to the cathode.

SUMMARY

In recent years, researches have been made in the development of air batteries that are used for power sources or auxiliary power sources of vehicles such as cars. In order to satisfy the power output and capacity required for vehicles, such air batteries have to be fabricated into an assembled battery by connecting a plurality of the batteries in series. Furthermore, because of a limited room for mounting a battery, downsizing is an important subject. However, because such conventional air batteries as described above cannot be directly connected to each other due to their structure, it has been practically impossible to apply such batteries to on-vehicle power sources. Therefore, there is a need for the development of novel air batteries.

The present invention was made in view of the above-described earlier circumstances, and it is an object of the present invention to provide an air battery that can be directly connected to the same batteries in series and is also suitable for an on-vehicle power source.

An air battery of the present invention includes a cathode layer and an anode layer sandwiching an electrolyte layer, and also includes an electrically insulative outer case that surrounds at least the peripheries of the electrolyte layer and the cathode layer. The cathode layer includes a cathode member, a cathode current collector, and a liquid tight/gas permeable member, said liquid tight/gas permeable member being disposed on the surface side of the cathode layer. Meanwhile, the anode layer includes an anode member and an anode current collector.

A feature of this air battery is that the cathode layer is provided with a contact member disposed between the cathode layer and the outer case, in which the inner end thereof is in contact with the rim of the cathode current collector, the outer end thereof is exposed at the side of the cathode surface, and the outer end of the contact member protrudes outward with respect to the surface of the liquid tight/gas permeable member to the extent reaching at least the plane including the end face of the outer case, i.e. to the extent being flush with the end face of the outer case or more.

According to the air battery of the present invention with the above-described configuration, the outer end of the contact member serves as a cathode terminal, and the anode current collector on the opposite side serves as an anode terminal, which enables direct series connection of the batteries. As a result, an assembled battery can be readily fabricated by connecting a plurality of the batteries, and the air battery is therefore very suitable for an on-vehicle power source.

BRIEF DESCRIPTION OF DRAWINGS

FIG. 1A is a cross sectional view, FIG. 1B is a plan view, and FIG. 1C is an enlarged cross sectional view at the portion of an outer case.

FIG. 10A and FIG. 10B are plan views.

FIG. 11A is a plan view, and FIG. 11B is a front view.

FIGS. 15A and 15B are plan views.

DESCRIPTION OF EMBODIMENTS

Hereinafter, an embodiment of the air battery of the present invention will be described in detail with reference to the drawings.

Figure 1A:
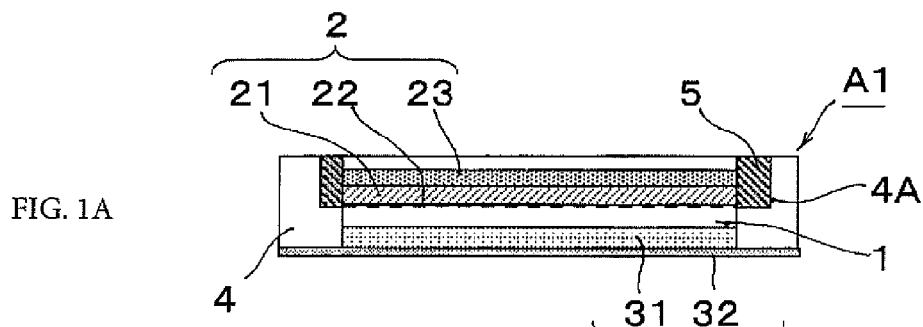
FIGS. 1A-1C are views for describing an embodiment of an air battery according to the present invention, where
Figure 1B:
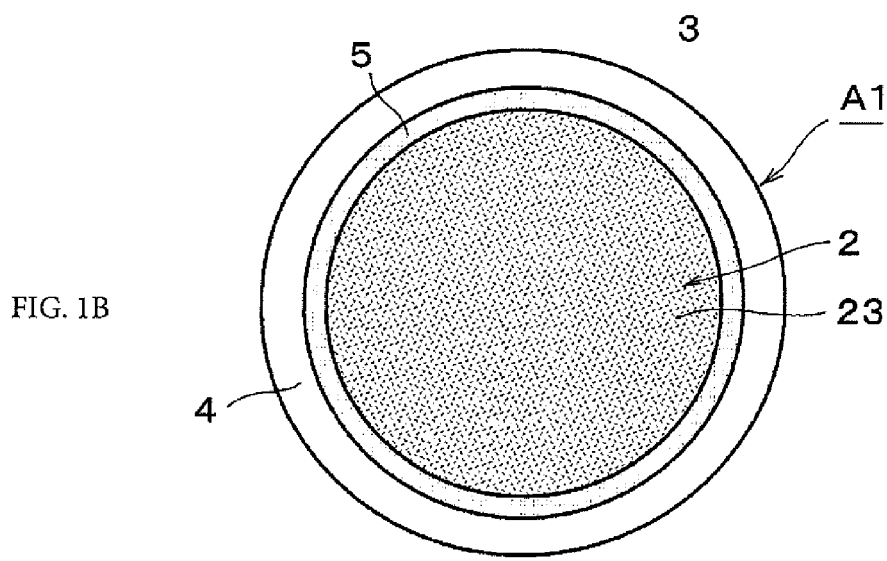
Figure 1C:
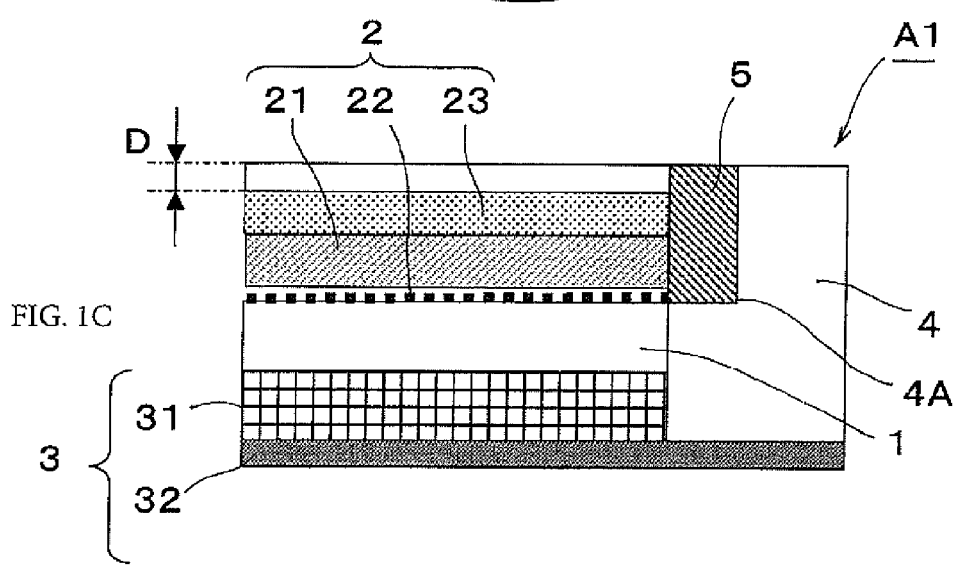

An air battery A1 illustrated in FIGS. 1A-1C, which is configured in a disk shape, includes an electrolyte layer 1 interposed between a cathode layer 2 at the upper side in the figure and an anode layer 3 at the lower side in the figure, and also includes an electrically insulative outer case 4 that surrounds at least the peripheries of the cathode layer 2 and the electrolyte layer 1.

The cathode layer 2 includes a cathode member 21, a cathode current collector 22 disposed on one side of the cathode member 21, and a liquid tight/gas permeable member 23 disposed on the surface side of the cathode layer 2, all of which are laminated together. In the embodiment illustrated in the figure, the cathode current collector 22 is provided on the cathode member 21 at the side of the electrolyte layer 1 (lower side in the figure). Further, the anode layer 3 includes an anode member 31 and an anode current collector 32, said anode current collector 32 being disposed on the surface side of the anode layer 3, all of which are laminated together.

The cathode layer 2 is provided with a contact member 5 between the cathode layer 2 and the outer case 4. The inner end of the contact member 5 (lower end in the figure) is in contact with the rim of the cathode current collector 22, and the outer end (upper end in the figure) is exposed at the side of the cathode surface. The outer end of the contact member 5 protrudes outward with respect to the surface of the liquid tight/gas permeable member 23 to the extent reaching at least the plane including the end face of the outer case 4. That is, the end face (upper face) of the contact member 5 protrudes to the extent being flush with the end face of the outer case 4 or more. In the embodiment illustrated in the figure, the end face of the outer end is flush and continuous with the end face of the outer case 4.

The electrolyte layer 1 is a separator impregnated with aqueous solution (electrolyte fluid) or non-aqueous solution that contains potassium hydroxide (KOH) or a chloride as a major component, and the separator has micropores at a predetermined proportion so as to be capable of containing the aqueous solution or non-aqueous solution. Further, the electrolyte layer 1 itself may be a solid or gel electrolyte.

The cathode member 21 of the cathode layer 2 is made of a conductive porous material containing a catalyst, for example, a conductive porous body made of carbon material and binder resin in which a catalyst such as manganese dioxide is supported.

The cathode current collector 22 ensures good electric conductivity of the cathode layer 2 in the in-plane direction (in the direction along the plane), and is a gas-permeable and electrically conductive member made of stainless, copper (Cu), nickel (Ni), carbon or the like. The ratio of the gas-permeable openings of the cathode current collector 22 is set according to the electric conductivity of the cathode member 21. If the cathode current collector 22 is made of a metallic mesh material, it may be selected from, for example, materials having an equivalent mesh size of from 50 to 600 Mesh. In addition to such metallic mesh materials, a carbon paper may also be used for the cathode current collector 22.

The liquid tight/gas permeable member 23 is liquid-(water-) tight against the electrolyte fluid of the electrolyte layer 1 while being gas permeable to oxygen. The liquid tight/gas permeable member 23 is made of a water repellent film of fluororesin or the like so as to prevent the electrolyte fluid from leaking out, and has many micropores so as to allow oxygen to be supplied to the cathode member 21.

The anode member 31 of the anode layer 3 is made of a pure metal such as lithium (Li), aluminum (Al), iron (Fe), zinc (Zn) and magnesium (Mg) or an alloy.

The anode current collector 32 is an electrically conductive member made of a material that can prevent the electrolyte fluid of the electrolytic layer 1 from leaking out, for example, stainless, copper (alloy) or a metal with an anti-corrosive metal-plated surface.

In this embodiment, the outer case 4 is configured in a circular ring shape, and includes a step 4A on the inner side for housing the contact member 5. Because the contact member 4 is a component of the cathode layer 2, the step 4A is formed at the opening of the outer case 4 at the side of the cathode layer. Further, the outer case 4 of this embodiment surrounds the periphery of the anode member 31 of the anode layer 3 in addition to the peripheries of the electrolyte layer 1 and cathode layer 2. Accordingly, the anode current collector 32 of the anode layer 3 has the same diameter as the outer case 4, and is disposed sealing the opening of the outer case 4 at the side of the anode.

The outer case 4 is preferably made of a resin resistant to electrolytic fluid such as polypropylene (PP) and engineering plastics. Such resins also contribute to weight reduction. To improve mechanical strength, the outer case 4 may also be made of a fiber-reinforced plastic (FRP), which is a composite resin with reinforcing fiber such as carbon fiber and glass fiber.

In this embodiment, the contact member 5 is configured in a circular ring shape, and has a cross-sectional area that fits in the step 4A of the outer case 4. The contact member 5 is made of a metal such as copper (Cu), stainless steel, nickel (Ni). Other metals may also be used if they are surface-treated to be resistant to the electrolytic fluid. Further, to reduce the contact resistance between the contact member 5 and the cathode current collector 22, at least either one of the contact faces may be plated with gold (Au), silver (Ag) or the like.

Figure 2:
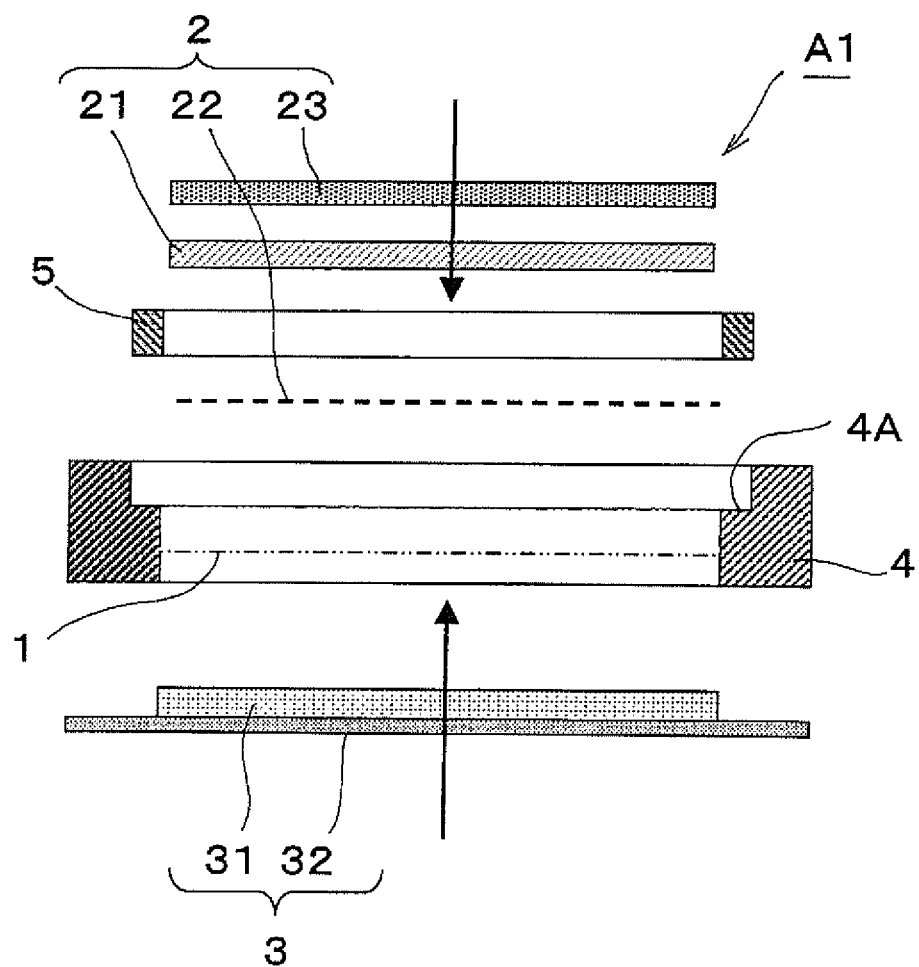
FIG. 2 is an exploded cross sectional view of the air battery of FIG. 1.

As illustrated in FIG. 2, in the above-described air battery A1, the cathode member 21, the cathode current collector 22 and the liquid tight/gas permeable member 23 are laminated to form the cathode layer 2, and this cathode layer 2 is installed inside the contact member 5. Meanwhile, the anode member 31 and the anode current collector 32 are laminated to form the anode layer 3. Along with installing the cathode layer 2 (or the anode layer 3), the electrolyte layer 1 shown by the virtual line in the figure is disposed inside the outer case 4. Thereafter, the anode layer 3 (or the cathode layer 2) is installed inside the outer case 4 so as to enclose the electrolyte layer 1.

A feature of the air battery A1 with the above-described configuration is that the energizing pathway in the cathode layer 2 involves the cathode current collector 22 and the contact member 5. Further, in the air battery A1, because the outer end of the contact member 5 protrudes outward with respect to the surface of the liquid tight/gas permeable member 23, a flat recess is defined inside the outer end of the contact member 5 where the depth D of the recess corresponds to the height difference from the liquid tight/gas permeable member 23.

Figure 3:
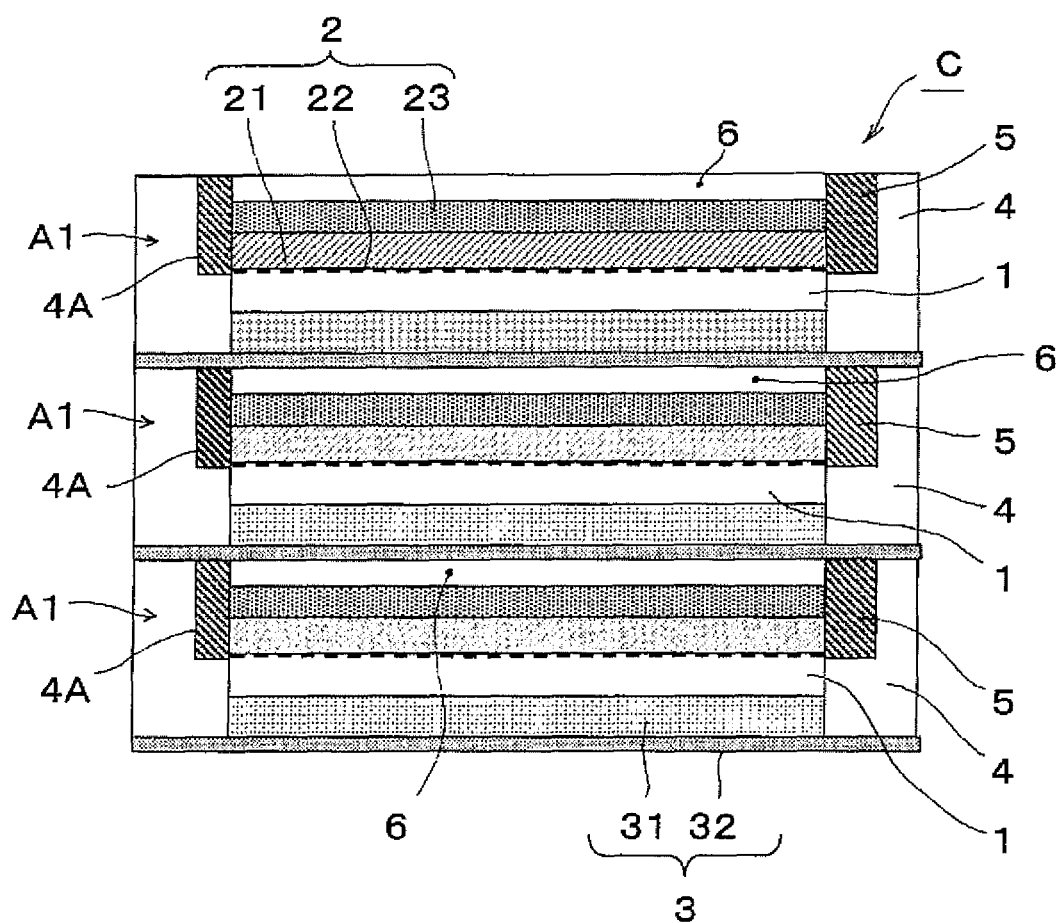
FIG. 3 is a cross sectional view illustrating an assembled battery fabricated by connecting the air batteries of FIG. 1 in series.

With this structure, the outer end of the contact member 5 serves as a cathode terminal while the anode current collector 32 on the opposite side serves as an anode terminal. Therefore, the air batteries A1 can be directly connected to each other in series. That is, an assembled battery C can be fabricated by directly connecting a plurality of the air batteries A1 in series as illustrated in FIG. 3, where the outer end of the contact member 5 is in contact with the anode current collector 32 of the adjacent air battery A1. Further, the above-described recess defines an air pathway 6 between the liquid tight/gas permeable members 23 and the anode current collector 32 of the adjacent air battery A1.

In this way, the air battery A1 can be readily fabricated into the assembled battery C by directly connecting a plurality of the air batteries A1. Therefore, the air battery A1 allows for the reduced size and simple structure of the assembled battery C, and is thus very suitable for an on-vehicle power source.

The thickness of the air pathway 6 may be suitably set depending on the output power and the supply form of oxygen, for example, within a range approximately from 1 to 10 mm. Further, because the contact member 5 is configured in a ring shape so as to form the air pathway 6 inside the outer end thereof as described above, it is desirable to provide a groove or a hole for introducing air to the air pathway 6 from the outside at a suitable position.

Furthermore, in the air battery A1, because the periphery of the battery is made of the electrically insulative outer case 4, the cathode terminal, which is the outer end of the contact member 5, and the anode terminal, which is the anode current collector 32, are located on opposite sides. This structure is less likely to develop a short circuit, and thus provides a high level of safety. In contrast, the structure that makes either one terminal serve as the outer case of the battery, such as those of ordinary button batteries, are unsuitable for on-vehicle power sources in terms of safety because of the short distance between the cathode and the anode.

Furthermore, in the air battery A1, because the outer end face of the contact member 5 is flush with the end face of the outer case 4, both of the contact member 5 and the outer case 4 come in contact with an adjacent air battery A1 if a plurality of the batteries are connected to each other. This improves the stability of the contact portion. Alternatively, in the air battery A1 of the present invention, the outer end of the contact member 5 may also slightly protrude with respect to the end face of the outer face 4. This structure increases the contact pressure by the outer end of the contact member 5 against the adjacent air battery 1, which can reduce the contact resistance.

In the air battery A1, a ring contact member or an integrally-formed ring-shaped contact protrusion, which correspond to the contact member 5, may be further provided on the outer face (lower face) of the anode current collector 32. These contact member and contact protrusion on the anode current collector 32 can also provide both of the direct in-series connection between the batteries and the assurance of the air pathway 6.

FIGS. 4 through 10 are views for describing other embodiments of air batteries according to the present invention. In the following embodiments, the same components as those of the previously-described embodiment are indicated by the same reference signs, and the description thereof is omitted.

Figure 4:
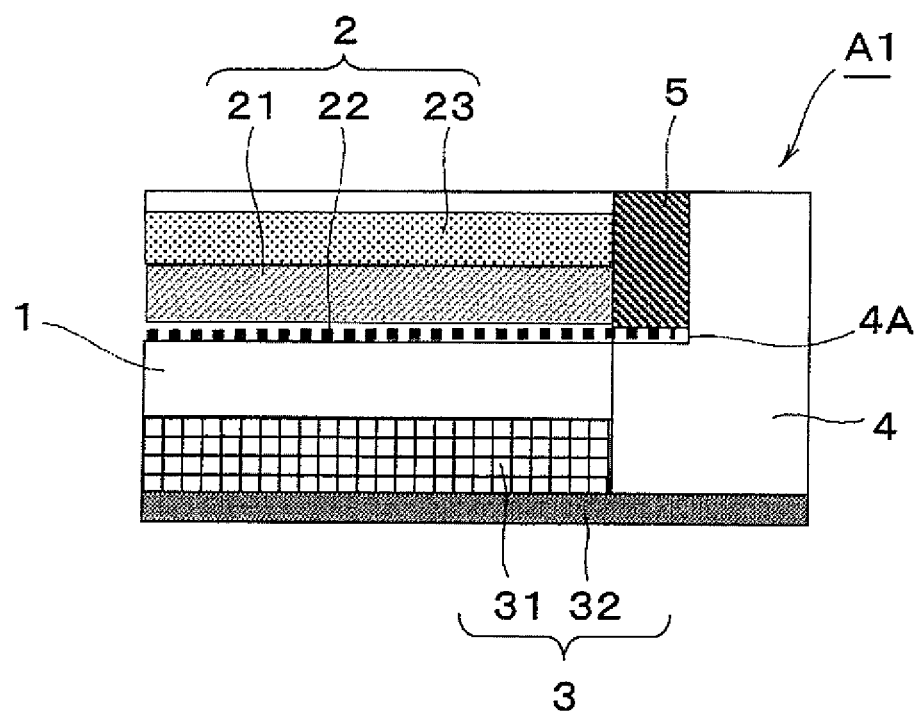
FIG. 4 is a cross sectional view for describing another embodiment of an air battery according to the present invention, illustrating the major components thereof.

As with the previously-described embodiment, an air battery A1 illustrated in FIG. 4 includes a cathode layer 2 that includes a cathode current collector 22 at the side of an electrolyte layer 1, and an outer case 4 that has a step 4A at the inner side for housing a contact member 5. In the air battery A1, the rim of a cathode current collector 22 is sandwiched between the platform (flat face) of the step 4A and the contact member 5.

In this air battery A1, in addition to the same functions and advantageous effects as those of the previously-described embodiment, the contact area between the cathode current collector 22 and the contact member 5 can be increased as large as possible so as to reduce the contact resistance or the constriction resistance. Furthermore, the step 4A of the outer case 4 determines the positions of the cathode current collector 22 and contact member 5, which is advantageous in terms of ease of installing the cathode layer 2 to the outer case 4.

Figure 5:
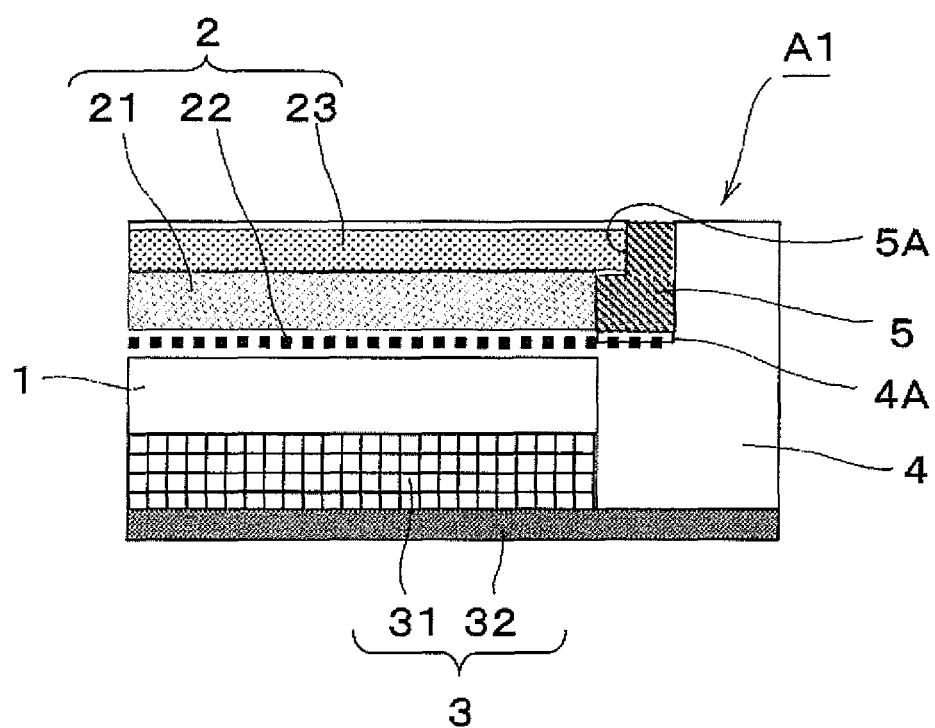
FIG. 5 is a cross sectional view for describing yet another embodiment of an air battery according to the present invention, illustrating the major components thereof.

An air battery A1 of FIG. 5 includes the same major components as those of the previously-described embodiment, in which a contact member 5 further has a recess 5A to support the rim of the liquid tight/gas permeable member 23. In this embodiment, the recess 5A is provided on the inner periphery of the contact member 5, and is configured in a step shape.

In this air battery A1, in addition to the same functions and advantageous effects as those of the previously-described embodiment, the electrolytic fluid of the electrolyte layer 1 can be prevented from leaking out more securely because the liquid tight/gas permeable member 23 has an area larger than the area of the cathode member 21. Furthermore, the recess 5A is advantageous in terms of ease of installing the liquid tight/gas permeable member 23 to the contact member 5.

Figure 6:
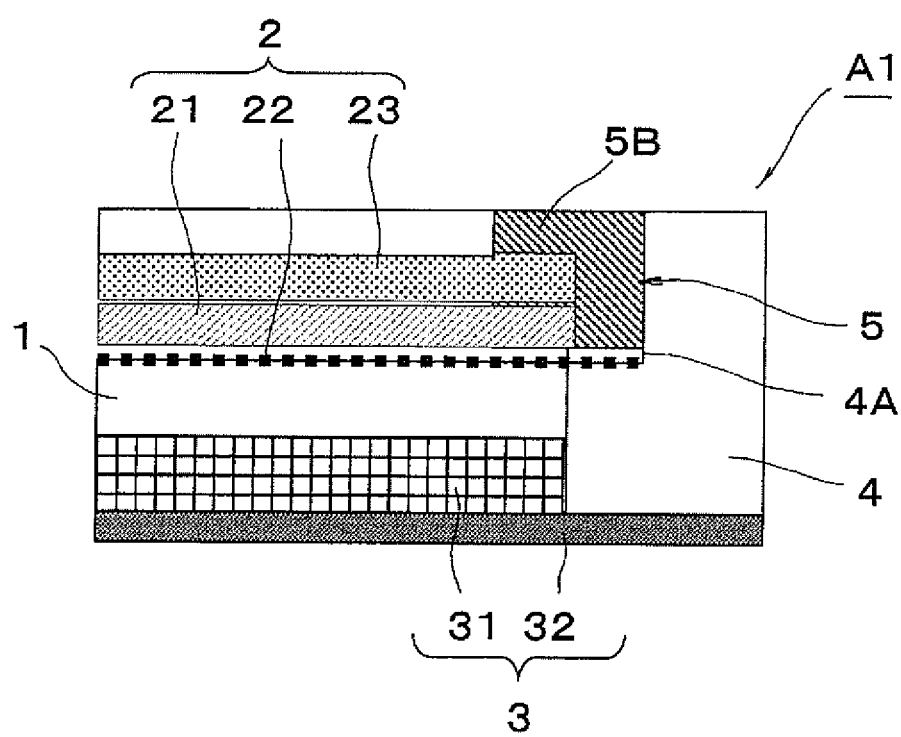
FIG. 6 is a cross sectional view for describing yet another embodiment of an air battery according to the present invention, illustrating the major components thereof.

An air battery A1 of FIG. 6 includes the same major components as those of the previously-described embodiment, in which a contact member 5 further includes a flange 5B that extends on the surface of the liquid tight/gas permeable member 23.

In this air battery A1, in addition to the same functions and advantageous effects as those of the previously-described embodiment, the outer end of the contact member 5 has a larger end face due to the flange 5B. This results in the larger contact area with an anode current collector 32 of an adjacent air battery A1 if the battery is fabricated into an assembled battery C, which can reduce the electrical resistance.

Further, in this air battery A1, the flange 5B can press and hold the cathode layer 2. This can reduce the contact resistance between the components of the cathode layer 2, and can also prevent the cathode layer 2 from coming off. Furthermore, in this air battery A1, at least the cathode member 21 and the cathode current collector 22 of the cathode layer 2 and the contact member 5 with the flange 5B may be pre-assembled, which can facilitate assembly of the battery.

Figure 7:
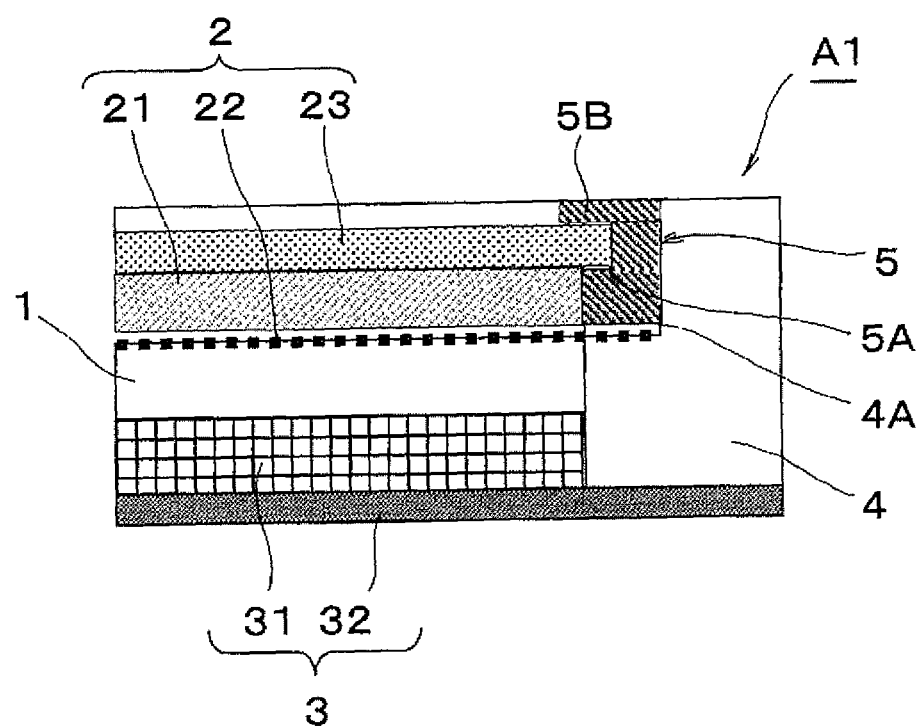
FIG. 7 is a cross sectional view for describing yet another embodiment of an air battery according to the present invention, illustrating the major components thereof.

An air battery A1 illustrated in FIG. 7 includes the same major components as those of the previously-described embodiment, in which a contact member 5 includes a recess 5A to support the rim of the liquid tight/gas permeable member 23 and a flange 5B that extends on the surface of the liquid tight/gas permeable member 23.

In addition to the same functions and advantageous effects as those of the previously-described embodiment, this air battery A1 has the advantageous effects due to the recess 5A such as preventing leak of the electrolytic fluid and the advantageous effects due to the flange 5B such as reducing the electrical resistance and contact resistance. In this embodiment, the contact member 5 may be composed of separate components of a body and the flange 5B.

Figure 8:
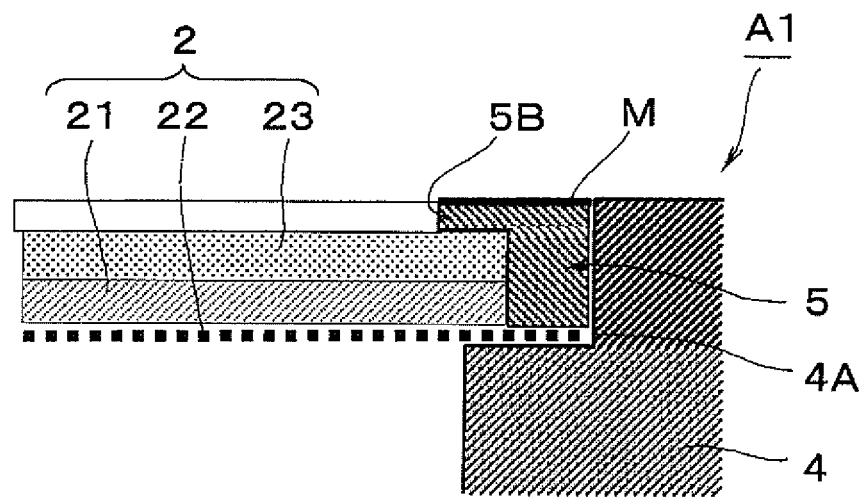
FIG. 8 is a cross sectional view for describing yet another embodiment of an air battery according to the present invention, illustrating the major components thereof.

An air battery A1 illustrated in FIG. 8 includes the same major components as those of the previously-described embodiment, in which a contact member 5 is made of a metal and includes a surface finish M on the outer end face. The surface finish M may be of any type, and is preferably a high-conductive coating. For example, a coating of a hard carbon such as diamond-like carbon may be used.

In addition to the same functions and advantageous effects as those of the previously-described embodiment, the surface finish M can further provide corrosion resistance, wear resistance and good conductivity to this air battery A1. If this air battery A1 is fabricated into an assembled battery C, it can reduce the contact resistance with an adjacent air battery A1.

Figure 9:
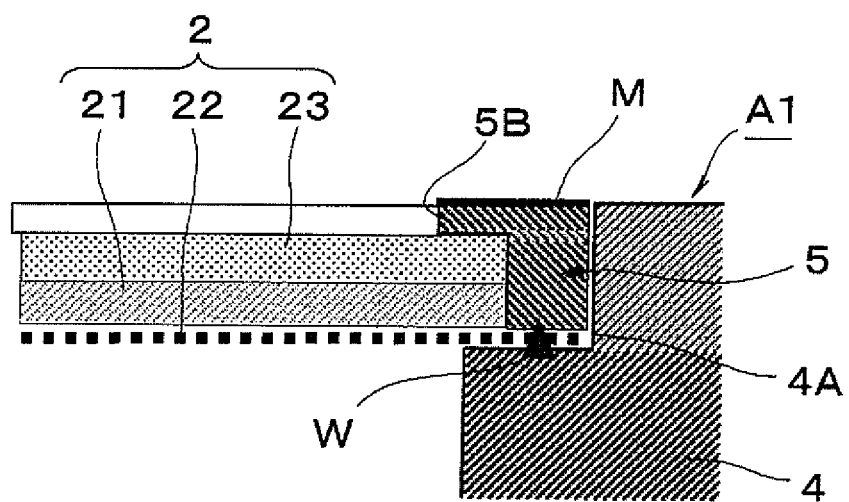
FIG. 9 is a cross sectional view for describing yet another embodiment of an air battery according to the present invention, illustrating the major components thereof.

An air battery A1 illustrated in FIG. 9 includes the same major components as those of the previously-described embodiment, in which a contact member 5 is made of a metal and includes a surface finish M on the outer end face, and the inner end face of the contact member 5 is at least partly joined to the rim of a cathode current collector 22 (indicated by reference sign W). The joining portion may be made by welding, adhesion or the like.

This air battery A1 has the same functions and advantageous effects as the previously-described embodiment as well as the advantageous effects due to the surface finish M. Furthermore, the joining W between the contact member 5 and the cathode current collector 22 can further reduce the contact resistance between them. Also, the joining M enables pre-assembling the components of the cathode layer 2 and the contact member 5, which can further facilitate the assembly of the battery.

Figure 10A:
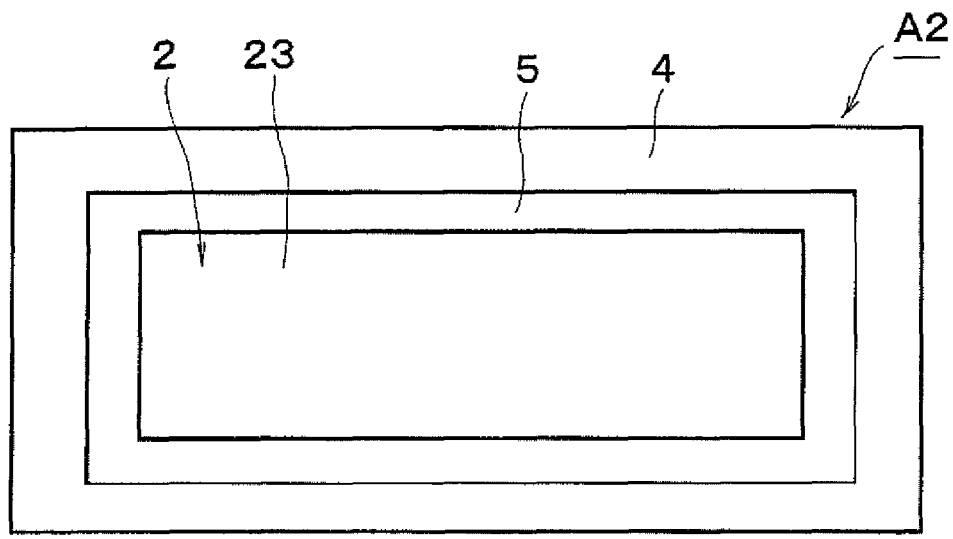
FIGS. 10A and 10B are views for describing yet another embodiment of an air battery according to the present invention, where
Figure 10B:
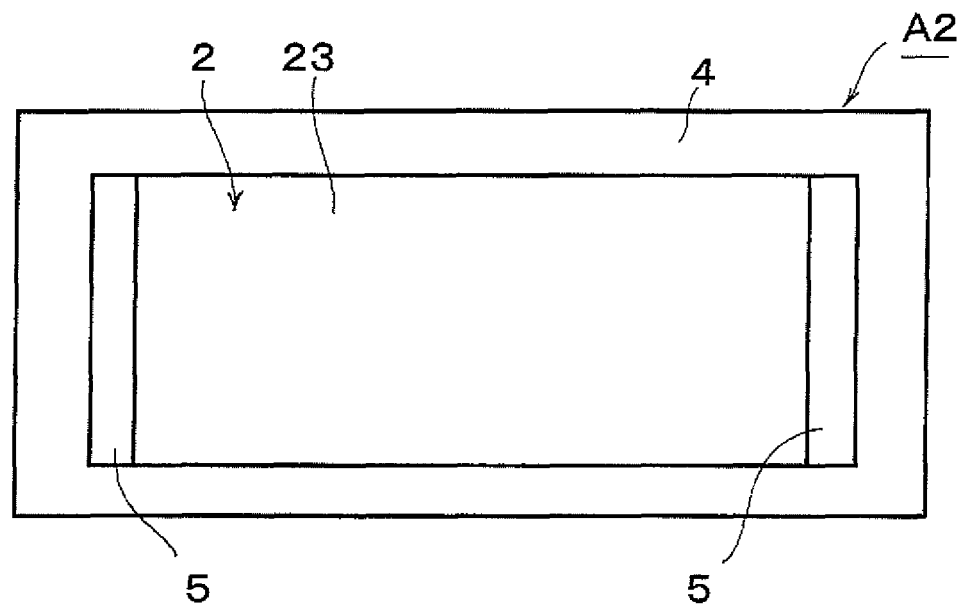

While the batteries of the previously-described embodiments are configured in a disk shape, an air battery A2 illustrated in FIG. 10A is configured in a rectangular plate shape. This air battery A2 has the same lamination structure as the previously-described embodiments, and includes a contact member 5 that is configured in a rectangular frame shape. Meanwhile, an air battery A2 illustrated in FIG. 10B includes contact members 5, 5 that are disposed at a pair of short sides. In these air batteries A2 configured in a rectangular plate shape as described above, the aspect ratio in a plan view and the number and arrangement of the contact member are suitably set according to the relationship between the amount of air supply and the pressure loss.

These air batteries A2 also have the same functions and advantageous effects as the previously-described embodiments. In addition to the disk shape and rectangular plate shape in the embodiments, the air batteries may also be configured in other shapes such as oval shape and polygonal shape. Also, one or plural contact member may be disposed.

Figure 11A:
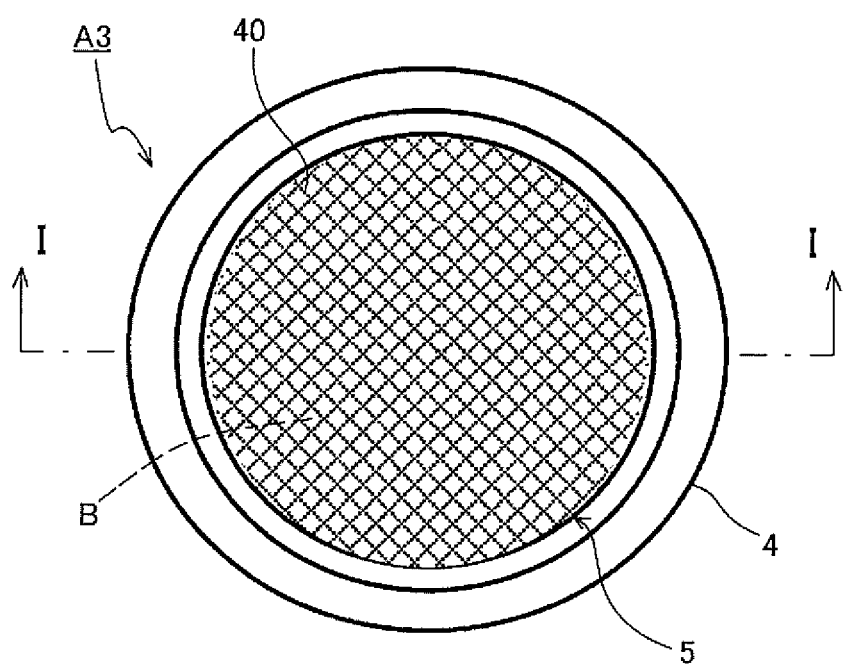
FIGS. 11A and 11B are views for describing yet another embodiment of an air battery according to the present invention, where
Figure 11B:
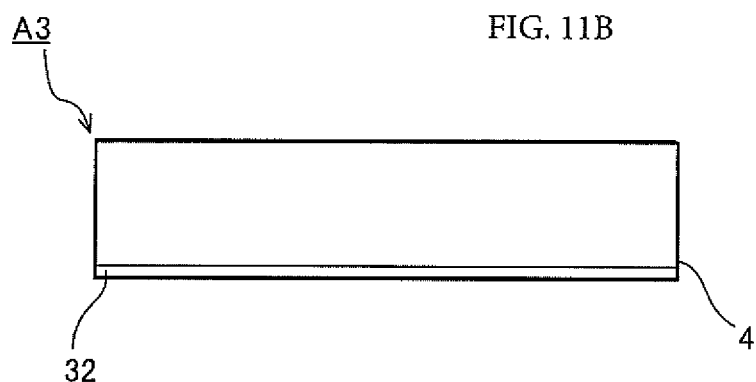
Figure 12:
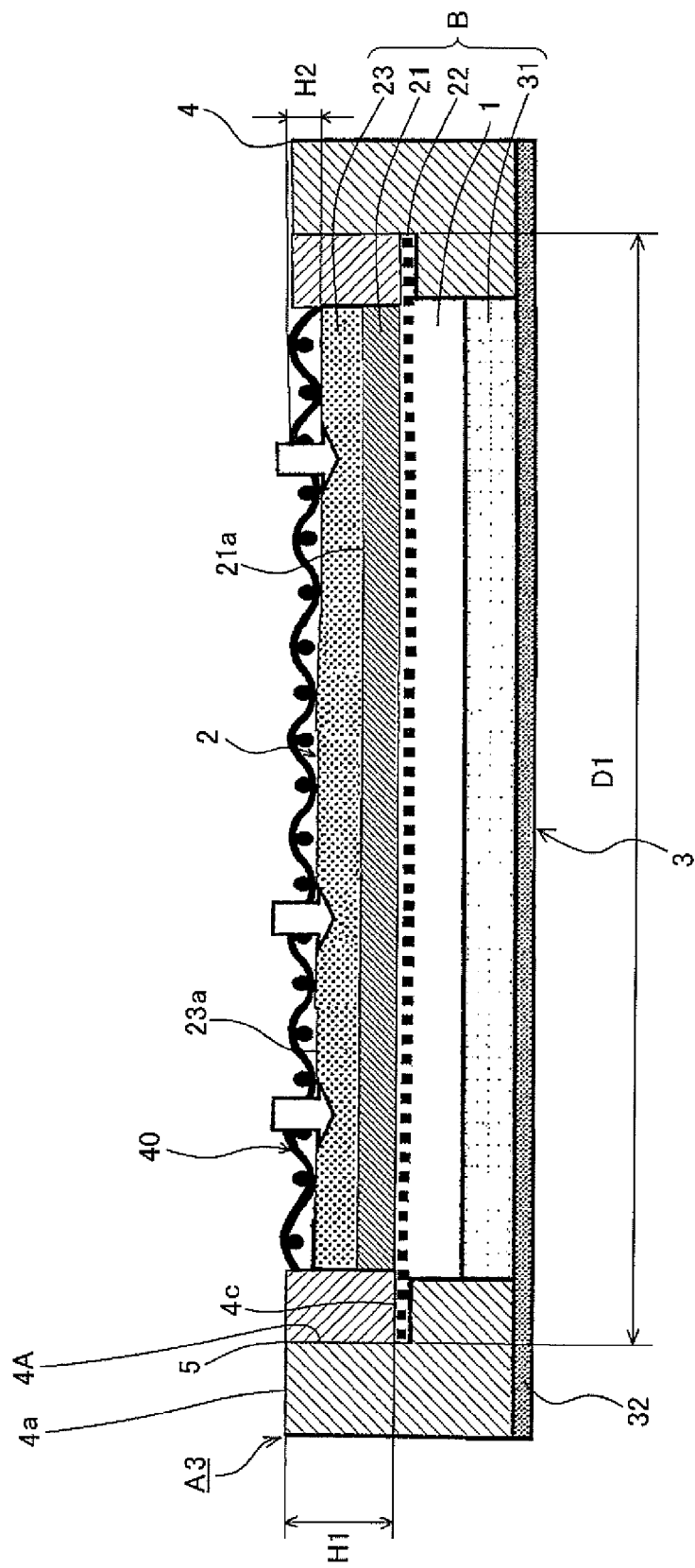
FIG. 12 is a cross sectional view taken along line I-I of FIG. 11.
Figure 13:
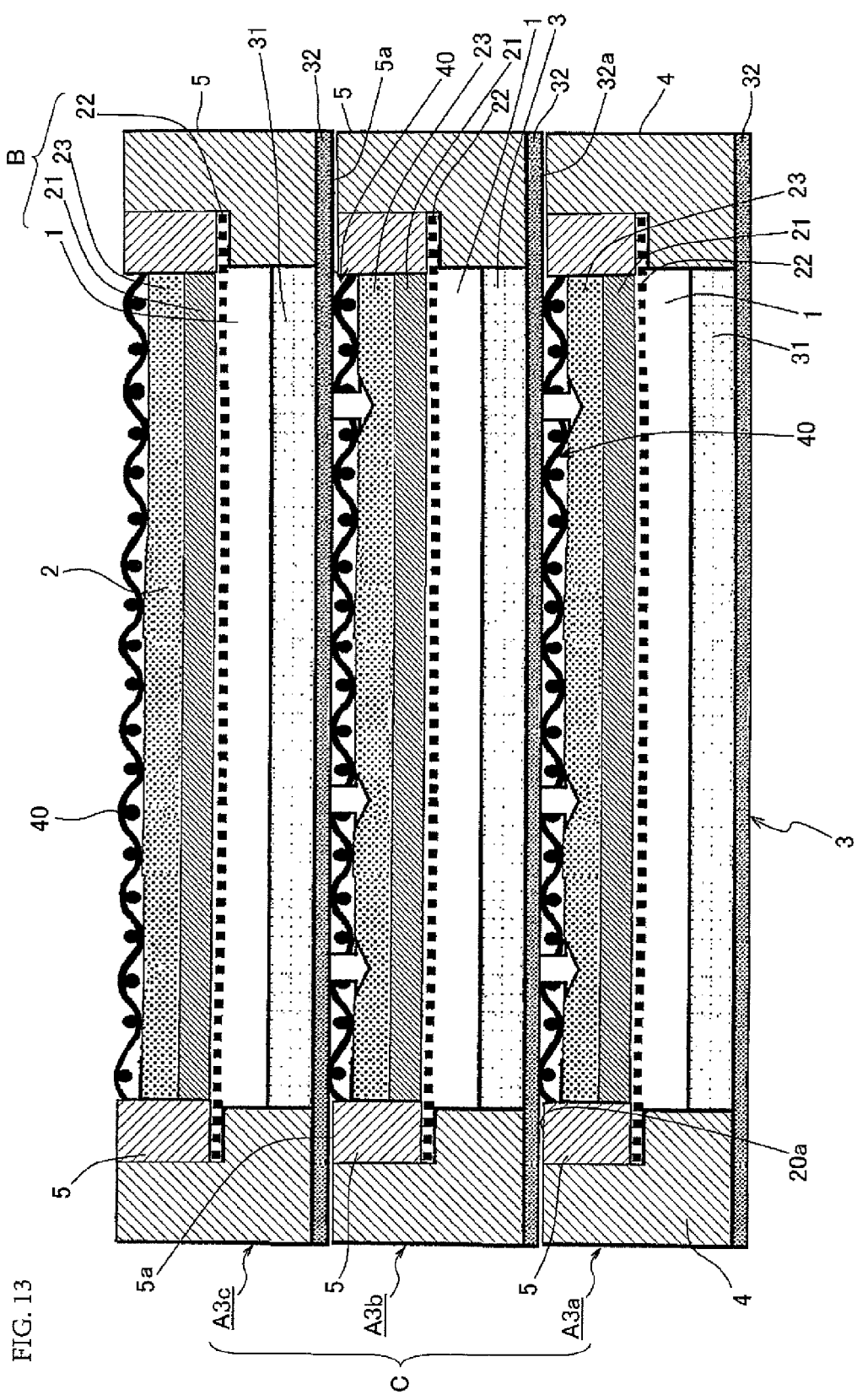
FIG. 13 is a cross sectional view of an assembled battery fabricated by stacking the air batteries of FIG. 11.

FIG. 11A is a plan view of an air battery according to yet another embodiment of the present invention, FIG. 11B is a front view thereof, FIG. 12 is a cross sectional view taken along line I-I of FIG. 1, and FIG. 13 is a cross sectional view of an assembled battery according to an embodiment of the present invention.

The assembled battery C of this embodiment is composed of three air batteries A3 that are stacked up in the vertical direction to form a three-tiered structure. The air battery A3 has the same basic structure as the previously-described embodiments, and the outer appearance thereof includes an outer case 4, a contact member 5, a power generating body B, a protector 40, and an anode current collector 32. In this embodiment, the power generating body B includes an electrolyte layer 1, a cathode layer 2 and an anode layer 3.

The outer case 4 is configured in a cylindrical shape with openings at both upper and lower faces. Near an opening 4a of the outer case 4, a step 4A is formed for fitting in the contact member 5 (described in detail below). The step 4A is configured such that the inner diameter D1 corresponds to the outer diameter of the contact member 5 and the height H1 is approximately equal to the height of the contact member 5.

As illustrated in FIG. 2, the power generating body B includes the electrolyte layer 1 that is made of a separator impregnated with electrolytic solution, and the cathode layer 2 and the anode layer 3 that are disposed respectively on one and the other sides of the electrolyte layer 1. Further, a liquid tight/gas permeable member 23 is laminated on the outer face of the cathode layer 2, and a cathode current collector 22 is disposed between the electrolyte layer 1 and the cathode layer 2.

The cathode current collector 22 is configured in a circular shape in a plan view having a size corresponding to the inner diameter of the step 4A, and is made of an electrically conductive metal mesh or the like with conductive holes that is sufficiently large to allow ions to pass through them. The cathode current collector 22 is fixed by the outer edge being interposed between the step 4A and the bottom wall 5c of the contact member 5 that is fitted in the step 4A.

The contact member 5 is made of an electrically conductive metal, and is electrically connected to the electrolyte layer 1 and to the cathode layer 2. The contact member 5 is provided for making an electrical contact with an anode current collector 32 of an adjacent another air battery A3 located at the upper side in the figure.

The contact member 5 of this embodiment is configured in a ring shape having a suitable outer diameter, and has such a height that it is flush with the opening 4a of the outer case 4 when fitted in the step 4A interposing the current collector 22 between the step 4A and the bottom face 5c.

The liquid tight/gas permeable member 23 is configured in a circular shape in a plan view having an outer diameter corresponding to the inner diameter of the contact member 5. In other words, the liquid tight/gas permeable member 23 is formed covering the outer face 21a of the cathode member 21.

The protector 40 prevents contaminants from penetrating the inside from the outside so as to protect the power generating body B, i.e. the cathode layer 2 and the like. The protector 40 is made of a gas permeable, electrically conductive and elastically flexible metal mesh that is configured in a circular shape in a plan view having an outer diameter corresponding to the inner diameter of the contact member 5. Specifically, the protector 40 is disposed covering the outer face 23a of the liquid tight/gas permeable member 23, and is in electrically-conductive contact with the contact member 5 at the periphery. The electrically-conductive contact may be formed, for example, by welding or the like as well as by abutment.

In this embodiment, the protector 40 is made of an ultrafine mesh having a mesh size of from #600 to #700 Mesh for example, and has an opening ratio higher than the opening ratio of the liquid tight/gas permeable member 23.

Further, the protector 40 has such a height H2 that it is slightly protrudes upward with respect to the upper face of the contact member 5 when mounted on the liquid tight/gas permeable member 23. That is, the protector 40 is configured to abut an anode current collector 32 of an adjacent another air battery A3 of the stacked batteries to be elastically deformed, so as to increase the contact area and to apply a compression load to the components.

Further, the total opening area of the protector 40 in the plane direction is larger than the total opening area of the liquid tight/gas permeable member 23 in the thickness direction. In other words, the opening area of the protector 40 in a plan view is larger than the total opening area of the liquid tight/gas permeable member 23 in the thickness direction.

This allows the air supplied through the protector 40 to be diffused toward the outer edge along the upper face of the liquid tight/gas permeable member 23, which enables supplying gas in the plane direction of the protector 40 even when another air battery is located adjacent to the protector 40. In this way, the power generation efficiency is improved.

In the assembled air battery C according to this embodiment, air batteries A3 as described above are stacked in the length direction of FIG. 3 to form a multi-tiered structure as illustrated in the figure. FIG. 3 illustrates an assembled battery in which three air batteries are stacked, however the number of the air batteries is not limited thereto.

In FIG. 3, when an air battery A3b is stacked on a lowermost air battery A3a, an abutment end face 5a of a contact member 5 of the air battery A3a abuts the lower face 32a of an anode current collector 32 of the air battery A3b so as to establish electrical conduction. Further, a protector 40 abuts the lower face 32a of the current collector 32 to be elastically deformed by the pressure so as to apply a suitable load to a liquid tight/gas permeable member 23 and a cathode layer 2 of the air battery A3a, which can reduce their contact resistances.

In the air battery A3b sandwiched between the two outermost air batteries A3a and A3c, a protector 40 abuts the lower face 32a of an anode current collector 32 of the air battery A3c (positioned on the top in the figure) to be elastically deformed by the pressure so as to apply a suitable load to a liquid tight/gas permeable member 23, a cathode layer 2 and the like as with the above-described air battery A3a, which can reduce their contact resistances. In the outermost air battery A3c, because a protector 40 covers a liquid tight/gas permeable member 23, a power generating body 30 is prevented from damages.

In the assembled air battery C of this embodiment, each air battery A3 is provided with a protector 40. However, the lowermost air battery A3a and the air battery A3b adjacent thereto at the upper side in the figure are not necessarily provided with a protector 40. That is, at least the air battery A3c is provided with a protector 40, which is located at the end tier of the stack (the upper end in FIG. 3) where a cathode layer 2 faces outward.

Figure 14:
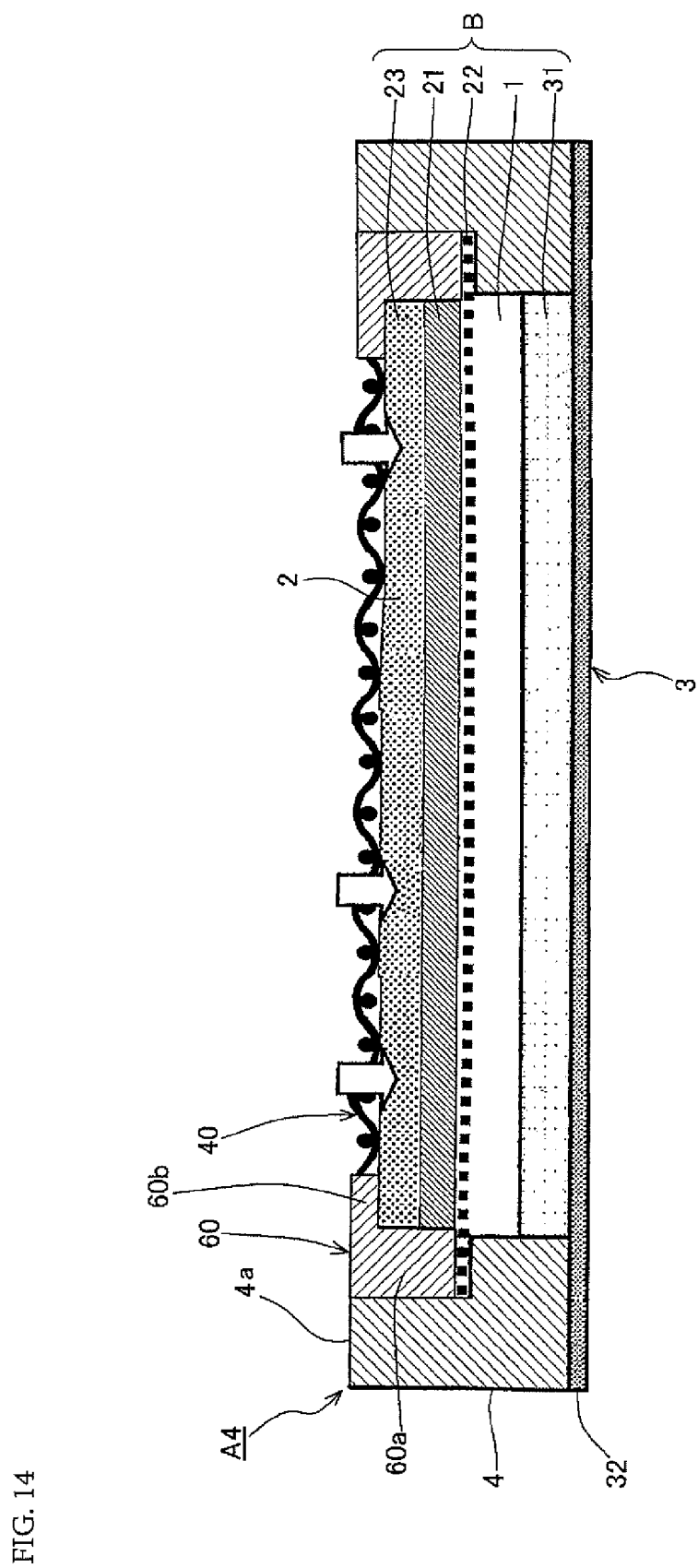
FIG. 14 is a cross sectional view illustrating yet another embodiment of an air battery according to the present invention.

Next, an air battery according to yet another embodiment will be described with reference to FIG. 14. FIG. 14 is a cross sectional view of the air battery. The same components as those of the above-described embodiments are indicated by the same reference signs, and the description thereof is omitted.

The air battery A4 of this embodiment employs a contact member 60 that is different from those of the above-described air batteries A3. The contact member 60 illustrated in FIG. 14 is made of an electrically conductive metal, and is electrically connected to an electrolyte layer 1 and to a cathode layer 2. The contact member 60 is provided for making an electrically-conductive contact with an anode current collector 32 of an adjacent air battery A4.

The contact member 60 includes a base 60a that is configured in a ring shape having a suitable outer diameter and a vertically long cross section, and a sandwiching piece 60b that protrudes inward from the upper part of the base 60a and has a constant width. The sandwiching piece 60b is provided for sandwiching the protector 40 between the sandwiching piece 60b and the liquid tight/gas permeable member 23.

As with the above-described embodiments, the contact member 60 has such a height that it is flush with an upper face 4a of the outer case 4 when fitted in a step 4A. With the contact member 60 having the above-described structure, the protector 40 can be fixed more firmly by being sandwiched.

The present invention is not limited to the above-described embodiments, and also includes the following variations.

Figure 15A:
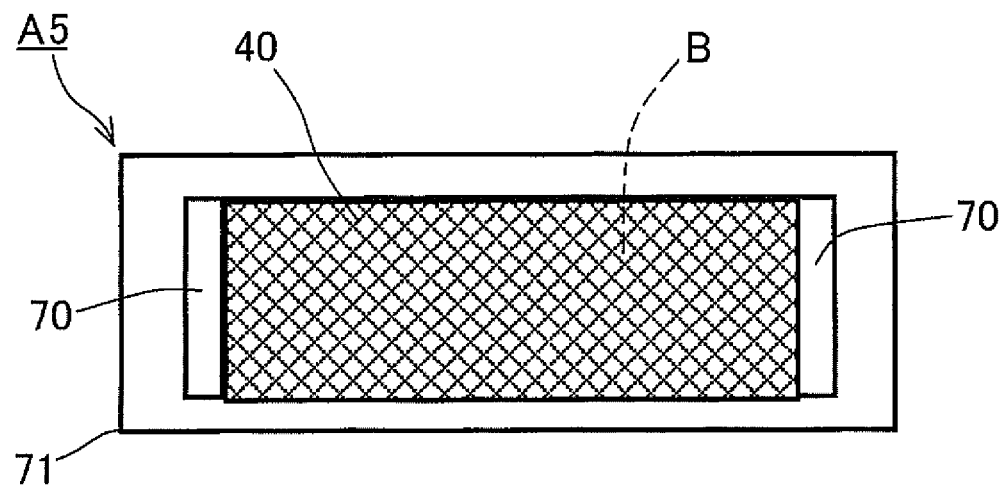
FIGS. 15A and 15B are views illustrating yet another embodiment of an air battery according to the present invention, where
Figure 15B:
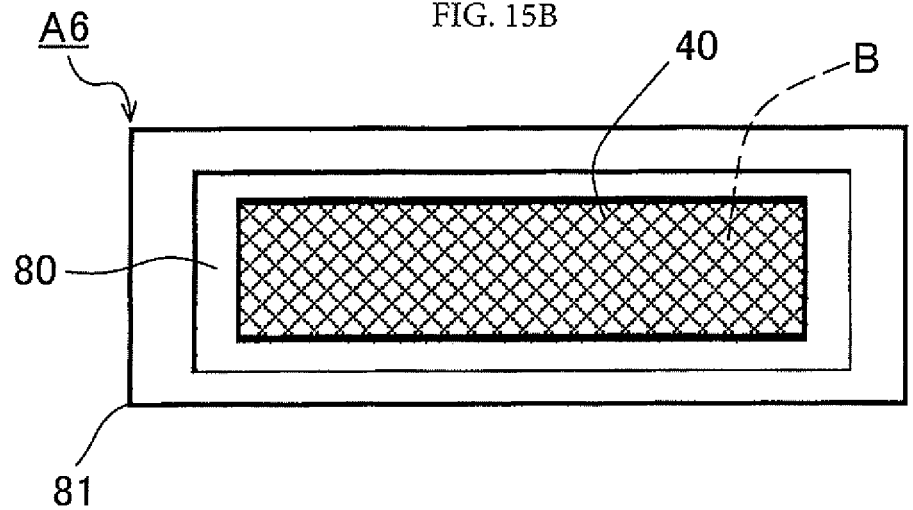

In the above-described embodiments, the air batteries are configured in a circular shape in a plan view. However, they may also be configured in the shape as illustrated in FIGS. 15A and 15B. FIG. 15A is a plan view of an air battery according to another embodiment, and FIG. 15B is a plan view of an air battery according to yet another embodiment. The same components as those of the above-described embodiments are indicated by the same reference signs, and the description thereof is omitted.

In the air battery A5 according to an embodiment as illustrated in FIG. 15A, the outer appearance thereof includes an outer case 71 configured in a rectangular shape in a plan view, contact members 70, 70, a power generating body B, a protector 40 and an anode current collector (not shown). The contact members 70, 70 are formed standing at both ends of the long sides of the outer case 71.

In the air battery A6 according to a fourth embodiment illustrated in FIG. 15(B), the outer appearance thereof includes an outer case 81 configured in a rectangular shape in a plan view, a contact member 80, a power generating body B, a protector 40 and an anode current collector (not shown).

The contact member 80 is a rectangular frame that is configured in a rectangular shape in a plan view so as to fit in the space defined by the inner walls of the outer case 81. These air batteries having the configurations as illustrated in FIGS. 15A and 15B also have the same advantageous effects as the above-described air batteries A1 through A4.

In the above-described embodiments, the protector 40 is made of a metal such as metal mesh. However, it may also be made of a resin. Alternatively, a resin protector may be provided on the top while a metal protector may be provided in the middle.

In the above-described embodiments, the assembled batteries are composed of stacked three air batteries. However, these three air batteries may be fabricated into a module, and an assembled battery may be composed of two or more modules.

In this case, a protector as described above is provided to the outermost (upper side in the figure) air battery of each module. This can protect a power generating body of the outermost air battery of each module. Further, by fabricating into a module, it becomes possible to replace a module including a faulty air battery in the event of a failure of one of the air batteries.

In the above-described embodiments, the protector may be made of an air-permeable, electrically-conductive and elastic metal mesh having a mesh size of from #600 to #700 Mesh, a resin mesh, an expanded metal or a metal or non-metal nonwoven fabric.

In the above-described embodiments, the electrolyte layer 1 may be made of a solid or gel electrolyte film.

The configurations of the air battery and assembled battery according to the present invention are not limited to those of the above-described embodiments, and the details thereof may be suitably changed without departing from the gist of the present invention.

The invention claimed is:

1. An air battery comprising:
a cathode layer comprising a cathode member, a cathode current collector and a liquid tight/gas permeable member disposed on a surface side of the cathode layer;
an anode layer comprising an anode member and an anode current collector;
an electrolyte layer sandwiched by the cathode layer and the anode layer; and
an electrically insulative outer case surrounding at least a periphery of the electrolyte layer and the cathode layer, wherein
the cathode layer is provided with a contact member made of metal between the outer case and the cathode layer, in which an inner end of the contact member is in contact with a periphery of the cathode current collector, and an outer end of the contact member is exposed on a cathode-side surface, and
the outer end of the contact member protrudes outward with respect to a surface of the liquid tight/gas permeable member to an extent reaching at least a plane including an end face of the outer case; and
a gas permeable protector to protect the cathode layer, disposed on an outer face of the liquid tight/gas permeable member, wherein the gas permeable protector is electrically conductive and is electrically connected to the electrolyte layer and to the cathode layer.

2. The air battery according to claim 1, wherein the cathode layer comprises the cathode current collector at a side of the electrolyte layer, and the outer case comprises a step at an inner side for housing the contact member, and the periphery of the cathode current collector is sandwiched between a platform of the step and the contact member.

3. The air battery according to claim 1, wherein the contact member comprises a recess to support a rim of the liquid tight/gas permeable member.

4. The air battery according to claim 1, wherein the contact member comprises a flange extending on a surface of the liquid tight/gas permeable member.

5. The air battery according to claim 1, wherein a surface finish is given on the end face of the outer end of the contact member.

6. The air battery according to claim 1, wherein the inner end of the contact member is at least partly joined to the periphery of the cathode current collector.

7. The air battery according to claim 1, wherein the contact member comprises a sandwiching piece to sandwich the gas permeable protector, and the gas permeable protector is fixed by being sandwiched between the sandwiching piece and the liquid tight/gas permeable member.

8. The air battery according to claim 1, wherein a total opening area of the gas permeable protector in a plane direction is larger than a total opening area of the liquid tight/gas permeable member in a thickness direction.

9. The air battery according to claim 1, wherein the gas permeable protector is made of a metal mesh, an expanded metal or a metal nonwoven fabric.

10. An assembled battery, comprising a stacked plurality of the air battery according to claim 1,
wherein the outer end of the contact member is in contact with the anode current collector of an adjacent air battery, and
an air pathway is defined between the liquid tight/gas permeable member and the anode current collector of the adjacent air battery.

11. The assembled battery according to claim 10, wherein at least the air battery which is located at an end of a stack where the cathode layer faces outside comprises a gas permeable protector to protect the cathode layer on an outer face of the liquid tight/gas permeable member.

12. An assembled battery, comprising a stacked plurality of the air battery according to claim 1,
wherein the outer end of the contact member is in contact with the anode current collector of an adjacent air battery,
an air pathway is defined between the liquid tight/gas permeable member and the anode current collector of the adjacent air battery, and
the gas permeable protector abuts the anode current collector of the adjacent air battery to be elastically deformed.

* * * * *